US006806972B1

(12) United States Patent
Daddis et al.

(10) Patent No.: US 6,806,972 B1
(45) Date of Patent: Oct. 19, 2004

(54) CUSTOMER PRODUCT INSTALLATION/CONFIGURATION

(75) Inventors: Elizabeth B. Daddis, Ontario, NY (US); C. Michael Ray, Fairport, NY (US); Robert G. Hamer, Canandaigua, NY (US); Susan B. Layer, Fairport, NY (US); Rex B. Murphy, Webster, NY (US); Gary R. Kern, Rochester, NY (US); Everett W. Jenkins, Raleigh, NC (US); Anne E. Dewitte, Fairport, NY (US); Robert W. Rassler, W. Henrietta, NY (US); David S. Matthews, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 1150 days.

(21) Appl. No.: 09/004,254

(22) Filed: Jan. 8, 1998

(51) Int. Cl.[7] .......... G06F 15/00
(52) U.S. Cl. .......... 358/1.1; 358/1.6; 358/1.14
(58) Field of Search .......... 358/1.1, 1.6, 1.14, 358/1.5, 1.15, 1.16, 1.17; 399/12, 13, 75, 110

(56) References Cited

U.S. PATENT DOCUMENTS

| | | | | |
|---|---|---|---|---|
| 5,457,784 A | * 10/1995 | Wells et al. | ................ | 395/829 |
| 5,592,881 A | 1/1997 | Rabjohns | ................ | 101/483 |
| 5,629,775 A | 5/1997 | Platteter et al. | ................ | 358/296 |
| 5,678,135 A | * 10/1997 | Fukui et al. | ................ | 399/77 |

FOREIGN PATENT DOCUMENTS

| | | | |
|---|---|---|---|
| JP | 2-311939 | * 12/1990 | ........... G06F/13/00 |

* cited by examiner

*Primary Examiner*—Mark Wallerson

(57) ABSTRACT

A method of determining the configuration of a plurality of resources in an image processing apparatus by running turn around tests to determine the interconnection of the resources and comparing the interconnection to a reference interconnection indicator stored in memory. The difference of interconnections between the reference indicator and the determined interconnections is then displayed to an operator for confirmation. An indication of the new configuration, if confirmed, is then loaded into memory and the machine is set up based upon the new configuration.

17 Claims, 4 Drawing Sheets

CUSTOMER PRODUCT INSTALLATION/CONFIGURATION

BACKGROUND OF THE INVENTION

The invention relates to a system architecture, and in particular, to a method of customer installation and configuration of a machine for optional features and devices.

In the electronic printing market, it is becoming more common that a particular printing or copying machine will be custom-designed for a particular customer. While any printer or copier will usually have at least one "marking engine," that is an apparatus which places marks on paper, other equipment essential to the customer's purpose may vary widely. For example, a customer may desire several paper feeders, each feeder capable of feeding a particular size or type of paper or special inserts; or, post-marking equipment, such as staplers, stackers, sorters, and binders, may be desired in different configurations by different customers.

In order to serve the needs of various customers most efficiently, it is desirable that a "modular" architecture for a printing or copying machine be employed. Typically, around a basic marking engine module, a particular customer may purchase only the special equipment desired. Some customers, for example, may require a stacker and a stapler, but have no need for a binder, while another customer may require three separate feeders for feeding three separate types of paper, such as letter size, legal size, and cover stock. With a modular architecture, it is ideal that a customer could simply plug in the extra modules as needed, and then have the system as a whole automatically adapt to the new architecture to use the marking engine with whatever equipment is physically connected to it.

An ideal modular architecture for a printing apparatus would have a control system that could immediately recognize changes in the architecture and instantaneously adapt to the new arrangement, such as when the user rolls up and plugs in a new accessory device. An ideal architecture would also allow a customer to easily reconfigure a machine and be able to quickly determine and confirm the configuration of a given machine.

In known prior art systems such as U.S. Pat. No. 5,629,775 issued May 13, 1997, assigned to the same assignee as the present invention, for controlling a large number of modules in a coordinated system such as for printing, it is typical to provide each individual module with a "name" or identification code so that the central control system can address a particular module as needed, in order to carry out a system-wide process. The addressing of individual modules by a central control can be performed either through direct one-to-one wiring between the control system and each individual module, or through an address bus.

It is also common to have every module have a dedicated identification code, by which it is addressed when operated by the control system. This arrangement, however, can be difficult if two physically identical modules are provided in the same system, as would be provided with two feeder modules each outputting a different type of paper.

It is also known in the prior art, for example, U.S. Pat. No. 5,592,881 issued Jan. 14, 1997 and assigned to the same assignee as the present invention, to provide a unique connection code for each connection between a pair of modules where a physical interaction between modules in the coordinated printing process can occur. An identification code is derived for a module by combining connection codes for a plurality of connections associated with the module. The module is caused to send a derived identification code to a controller and the module is operated by the controller addressing the module by the identification code.

It is also known, as disclosed in Ser. No. 08/670,830 filed Jun. 24, 1996, and assigned to the same assignee as the present invention to autoconfigure node identifications for elements on a network. Specifically, there is shown a method of determining the order of interconnection of the plurality of resources in a chain by disabling communications by each processor in the chain to the processors following in the chain and setting an autoconfiguration signal on a command control bus. The system controller then sends a message to the first processor in the chain, the processors not being disabled by a processor preceding in the chain. That processor then enables communication to the processor following in the chain and the process repeated to determine the order of all resources in the chain.

A difficulty with prior art devices is the need for a simple method for a customer to be able to configure a machine and be able to confirm the configuration. It would be desirable, therefore, to provide a system that overcomes the above defined difficulties.

It is an object of the present invention, therefore, to allow a customer to easily reconfigure a machine by the process of a machine determining its configuration and writing the configuration into memory after customer confirmation. It is another object of the present invention to run a series of turnaround tests to determine machine configuration and provide an interactive interface program to step a customer through an install process. It is still another object of the present invention to provide an additional layer of diagnostics by checking machine configuration at machine power up.

Other advantages of the present invention will become apparent as the following description proceeds, and the features characterizing the invention will be pointed out with particularity in the claims annexed to and forming a part of this specification.

SUMMARY OF THE INVENTION

More particularly, the present invention relates to an electronic image processing apparatus and a method of determining the configuration of a plurality of resources in the image processing apparatus by running turn around tests to determine the interconnection or configuration of the resources. A subset of the configuration is then displayed on the user interface for confirmation by the user An indication of the new configuration, if confirmed, is then loaded into memory and the machine is set up based upon the new configuration.

For a better understanding of the present invention, reference may be had to the accompanying drawings wherein the same reference numerals have been applied to like parts and wherein:

DESCRIPTION OF THE INVENTION

Figure 1:
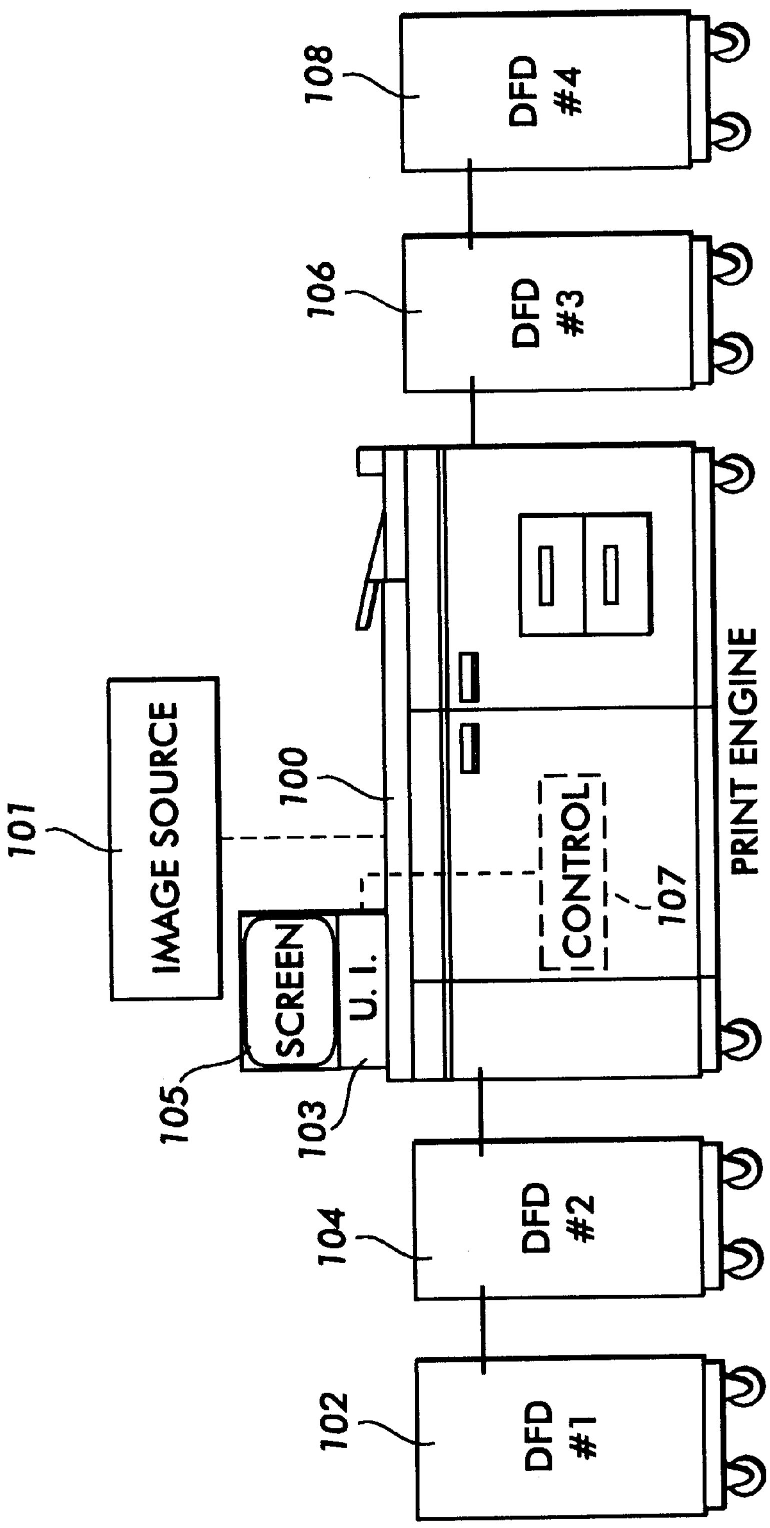
FIG. 1 is a block diagram depicting the physical layout of a typical prior art printing system.

FIG. 1 is a simplified elevational view of a configuration of modules as would be found in a typical prior art high-speed, high-volume electrophotographic printer, configured for a typical purpose. The central module in the system is the marking engine module, here indicated as 100. This marking engine module 100 accepts sheets along a paper path from an external source, and then places marks on the sheet in accordance with electronic or other information supplied from an image source, here indicated as 101. Image source 101 may be either an electronically-controlled system for creating images such as a host computer, a hard-copy digital scanner, or alternately could be part of a light-lens system for direct exposure of the photoreceptor in marking engine module 100. The specific image generated by image source 101 for printing by marking engine module 100 at any particular time will, of course, be dependent on the instantaneous availability of a particular desired sheet fed into marking engine 100.

As shown in FIG. 1, the particular illustrated configuration includes two paper feeder modules, respectively, indicated as 102 and 104. It is typically desirable to have multiple paper feeder modules in a system, either so that one of two sizes of sheets are readily available at any time, or else to have a module dedicated to feeding a particular type of sheet, such as a letterhead sheet, cover stock, tab stock, or transparencies. It is a common application of high-volume printing systems that different feeder modules such as 102 or 104 are called upon within a single print job, such as to interleave tab stock with regular pages, or to supply heavy-bond covers at the front and back of a stack of regular sheets, to form a booklet. It will be noted, in the configuration of FIG. 1, that the printer modules 102, 104 are provided in series along a single paper path P so that, for example, a sheet fed from module 102 will have to pass through module 104 along paper path P in order to reach marking engine module 100. Also shown in FIG. 1 is a user interface 103 with screen 105 connected to control 107 for displaying various prompts and messages to an operator.

On the other side of marking engine 100 can be provided any number of different types of "finishing" modules, which are used to assemble loose printed sheets of various types into finished products, such as booklets. Two example finishing modules are shown in FIG. 1. Module 106 is a stapler module which collects sheets fed into it, staples them as required, and then stacks the stapled booklets. Module 108 is a sorter or mailbox module which, in accordance with job ticket instructions associated with a particular print job, can direct a printed sheet from marking engine 100 to one of a plurality of mailboxes. Of course, any number of other types of finishing modules, such as further mailbox modules, heat binders, envelope stuffers, slitters or perforators, etc. can be imagined. It will be noted that the series relationship of finishing modules is the same as with the feeder modules 102, 104: when, for example, stapler module 106 is not required, a sheet moving along paper path simply passes through stapler module 106 untouched and into the desired further module such as 108.

The series relationship of the different feeder and finishing modules in a system requires that a control system recognize the precise relationship among modules in the system, even in situations where a particular module is not being used. For example, if, to print a particular desired print, a sheet must be fed from a stack in feeder module 102 and then after printing sent to a particular mailbox in sorter module 108, the control system must take into account the fact that the sheet must take time to pass through module 104 before printing in module 100, and then pass through stapler module 106 before reaching sorter module 108. In some control system arrangements, unused modules such as 104 and 106 must be controlled to allow the pass-through of certain sheets. In brief, controlling of a modular system requires that the control system always have a basic "topography" of the entire physical system, even in situations where only a subset of the modules in the system are actually being used.

Figure 2:
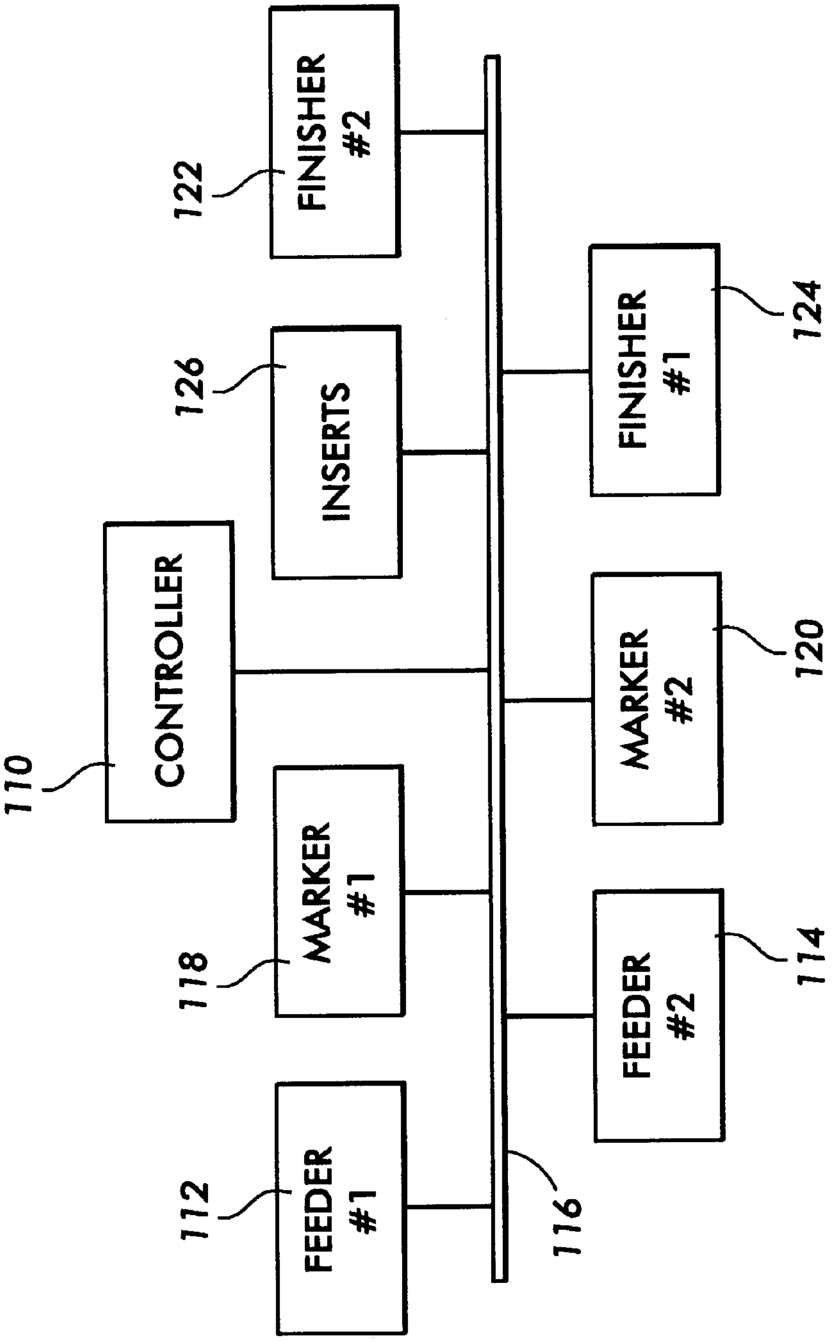
FIG. 2 is a block diagram depicting an arbitrary configuration of a printing system illustrating the present invention.

The control 107 of the present invention provides a method by which a control system can readily establish a physical topography of a particular configuration of any arbitrary modular printing system and display the configuration for operator confirmation. FIG. 2 is an arbitrary modular printing system illustrating the scope of the types of systems incorporating the present invention. In particular, controller 110 and Feeders 112, 114 are connected to common communication channel 116. Also interconnected to the communication channel 116 are Markers 118, 120, Finishers 122, 124, and Insert Source 126.

As is well known, the feeding devices can be sources of printable media like paper for providing a marker with stock for completion of the printing process or devices which supply image data such as automatic document handlers and re-circulating document handlers. Feeding devices also includes devices which provide image data electronically such as a network interface for printers. The finishing devices can be any suitable devices such as sorters, compilers, staplers, folders, or trimmers. It should be noted that FIG. 2 is only one embodiment and meant to illustrate a functional view of the devices rather than actual physical placement. Feeding devices such as paper trays and insert sources supply an increased level of printable stock selection to the printer. This could be for the purpose of having multiple colors of tabs or separator stock or front and rear cover stock with a clear cover sheet. Or it could be a check printing application where there is a variety of scenes pre-printed and each is fed in a collated order to build a check book with the proper cover sheets and rear cover stock.

In accordance with the present invention, in general a machine first determines its configuration, for example, it determines the image processing configuration and the type and number of feeding and finishing devices after installation. This configuration is written into non-volatile memory after customer confirmation. The confirmation is enabled by running a series of turn around tests when the machine powers on to determine the makeup of the machine. The machine provides an interactive user interface program that steps the customer through an install process.

Specifically, the machine informs the customer that auto-configuration is occurring. While this screen is displayed, the machine is running the turnaround test to determine its configuration. A subset (those the customer can observe as part of the system) of the configuration details are then displayed. The customer is asked to confirm the correct configuration. If the customer enters 'yes', the configuration is loaded into non-volatile memory (NVM) or any other suitable persistent memory. If the customer enters 'no', a call Customer Service is suggested.

After the customer confirms the configuration, the machine will automatically step through any set-up routines that may be required, depending upon the machine's configuration. These currently include, in a preferred embodiment, set time and date, Remote Data Transfer (RDT) set-up, tray registration set-up, disc finisher set-up, enter customer service number, and xerographic set-up. When the set-up routines are completed, the machine is ready for operation.

The turn-around tests which are run to determine the machine configuration are also run at each subsequent power-on of the machine. This enables two features: one is the ability for the customer to change the machine's configuration without a service call and the second is added diagnostic capability. If the customer wants to alter the machine's configuration (i.e. alter the finisher), the customer powers off the machine, makes the mechanical changes and then powers the machine back on. The machine will run the turn-around tests, compare the results with the configuration that is stored in NVM and note the change. The UI will display the altered configuration item and ask the user or customer to confirm. If the user confirms the change the new configuration is loaded into NVM. For example, the new configuration could simply be a default change such as changing from an OCT to a disc finisher. If the user or customer disagree, a fault is logged and they are instructed to call Customer Service. This feature allows the customer to make the change interdependently and, if no change was made, allows the machine to detect a machine failure prior to the customer trying to use the machine.

The product installation/configuration concept provides several new features to customers and to the machine: The machine can determine its own configuration by utilizing a series of diagnostic turn-around tests, the customer can install the machine (this is enabled since a Customer Service representative is not required to be present to load configuration information into NVM), and the customer can reconfigure the machine any time quite easily since the machine can realize the changes on its own. It also provides an extra layer of diagnostics by checking the configuration at each power-up of the machine. If the configuration at power-up is different than the previous configuration and the customer does not confirm, then there is detected failure (i.e. can't talk to an I/O device). The customer can then be informed of the problem and told to call Customer Service before using the machine.

Figure 3:
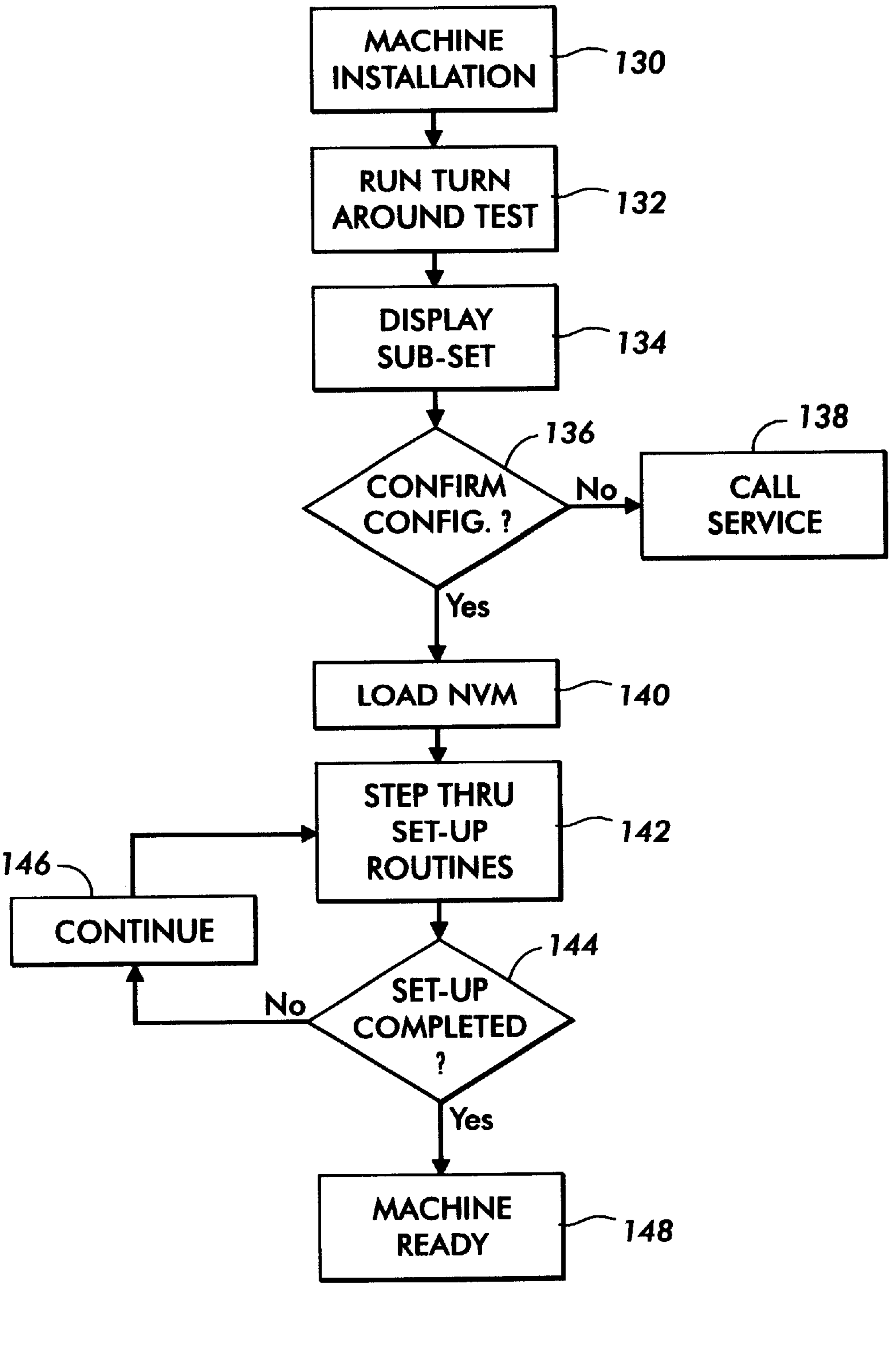
FIG. 3 is a flow chart illustrating configuration confirmation at machine installation in accordance with the present invention.

With reference to FIG. 3, in accordance with the present invention there is illustrated a configuration confirmation at machine installation. In particular, a machine is installed as shown at block 130 and a series of turnaround tests are activated as shown at block 132. Once the configuration of the machine is determined, a subset of the configuration is displayed to the operator shown at block 134. The subset is merely those features of the configuration that are necessary for the operator to understand the interconnection of the various components. At decision block 136, the operator either confirms or does not accept the configuration. If the operator does not accept the configuration, (the configuration is not what the operator or customer intended or expected) a call to service is made as illustrated at block 138. The display includes messages prompting the customer to recognize the configuration and interconnected features as well as a prompt to confirm or reject.

If the customer accepts the configuration, the customer acknowledges by suitable activation or engagement of a button or screen display. At this point, an indication of the configuration is loaded into nonvolatile memory as illustrated at block 140. The next step is for the machine control to step through setup routines corresponding to the confirmed configuration of features as shown in block 142. Decision block 144 determines whether or not the setup is completed. If not, the set up routines are continued as illustrated at block 146. If the setup routines are completed, the machine is ready for operation in the confirmed configuration as illustrated in block 148.

Figure 4:
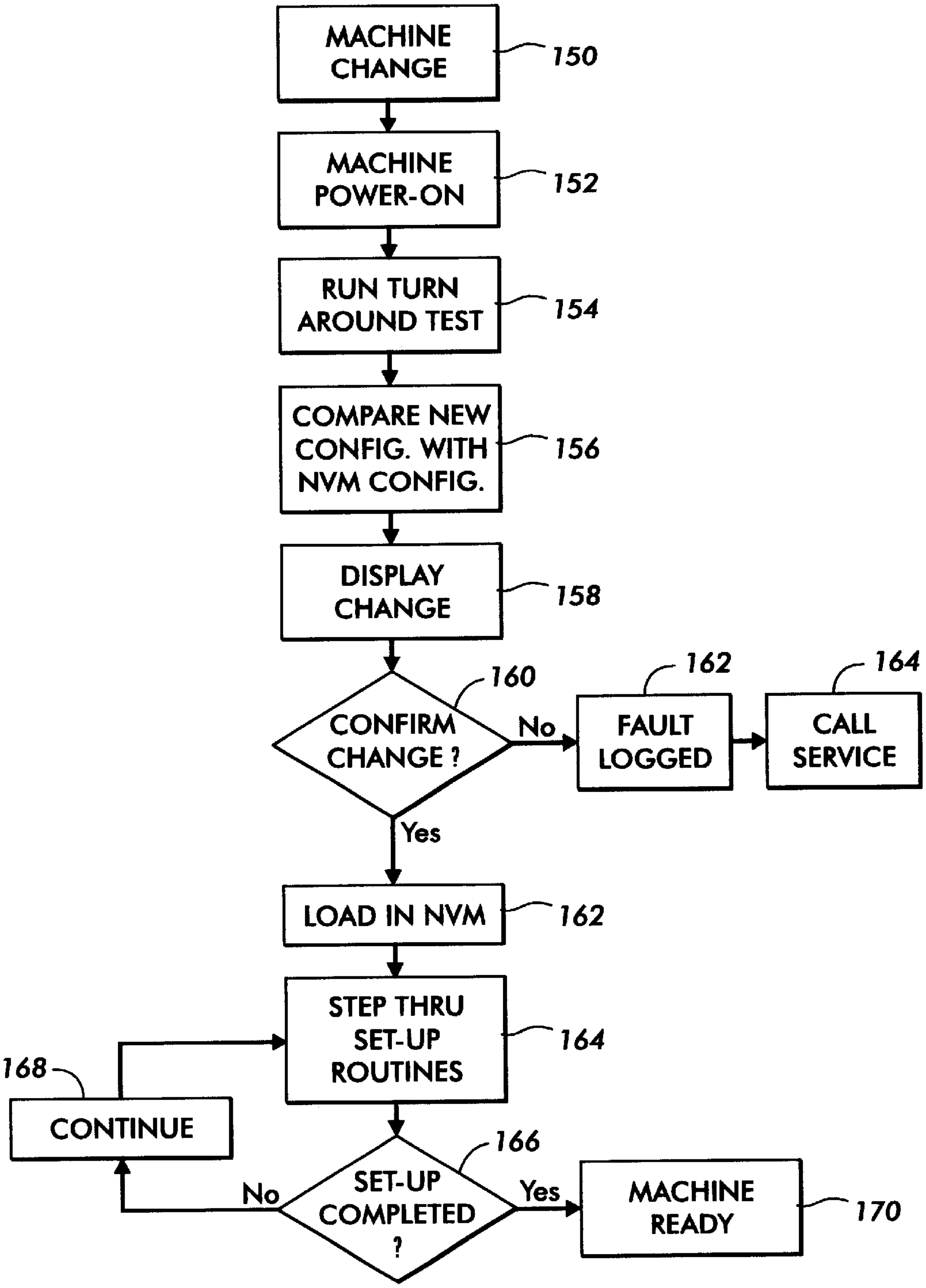
FIG. 4 is a flow chart showing confirmation of configuration changes in accordance with the present invention.

FIG. 4 illustrates the confirmation of the machine configuration after a machine change. In particular, block 150 illustrates a machine configuration change. This could be various feature changes to the machine such as adding a different finisher feature or initiating a remote data transfer feature. At machine power on, shown at block 152, the machine control initiates the turnaround test illustrated at block 154. These turnaround tests determine the configuration of the machine which is compared with the indication of configuration, stored in nonvolatile memory illustrated in block 156. At block 158 there is a display of the difference between the previous configuration stored in nonvolatile memory and the new configuration as a result of a machine change. This difference is presented to the customer in message format to alert the customer as to the new configuration and to request from the customer a confirmation of the new configuration as illustrated in decision block 160.

If the customer does not confirm by suitable activation of a button or indicator, a fault is logged as shown in block 162 and a suggestion to call service displayed as shown in block 164. If the customer confirms the change, then an indication of the new configuration replaces the indication of the old configuration in nonvolatile memory as shown in block 162. The system then steps through the setup routines for the new configuration shown in block 164 and in decision block 166, a determination is made as to whether the setup routines have been completed. If not, as illustrated in block 168, the step through setup routines continue. If the setup routines are completed, the machine is then ready as illustrated at block 170.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

What is claimed is:

1. In an electronic image processing apparatus comprising a plurality of resources including a marking machine, a source of copy sheets, and a controller, a method of determining the configuration of the plurality of resources comprising the steps of:

running turn around tests to determine the interconnection of the resources, comparing the determined interconnection to a reference interconnection stored in memory, displaying the difference of interconnections between the reference and the determined interconnections, confirming the difference and loading the determined interconnection into memory, and setting up the machine based upon the determined interconnection.

2. The method of claim 1 wherein the memory is nonvolatile memory.

3. The method of claim 1 wherein the step of setting up the machine based upon the determined interconnection includes the step of automatically running selected machine set up routines.

4. The method of claim 1 including the step of initiating a service call.

5. The method of claim 1 wherein the step of displaying the difference of interconnections between the reference and the determined interconnections includes the step of displaying a portion of the difference.

6. The method of claim 1 wherein the step of setting up the machine based upon the determined interconnection includes the step of automatically running through set up routines corresponding to a confirmed machine configuration.

7. The method of claim 1 wherein the step of confirming the difference and loading the determined interconnection into memory includes the step of an operator providing a confirmation entry at an operator interface.

8. In an electronic image processing apparatus comprising a plurality of resources including a marking machine, a source of copy sheets, and a controller, a method of determining the configuration of the plurality of resources comprising the steps of:

running turn around tests to determine the interconnection of the resources, comparing the determined interconnection to a reference interconnection stored in memory, displaying the difference of interconnections between the reference and the determined interconnections, confirming the difference by an operator providing a confirmation entry at an operator interface and loading the determined interconnection into memory, and setting up the machine based upon the determined interconnection.

9. The method of claim 8 wherein the step of setting up the machine based upon the determined interconnection includes the step of automatically running through set up routines corresponding to a confirmed machine configuration.

10. In an electronic image processing apparatus comprising a plurality of resources, a method of determining the configuration of the plurality of resources comprising the steps of:

running turn around tests to determine the interconnection of the resources, comparing the determined interconnection to a reference interconnection stored in memory, displaying the difference of interconnections between the reference and the determined interconnections, confirming the difference by an operator providing a confirmation entry at an operator interface and loading the determined interconnection into memory, and setting up the machine based upon the determined interconnection.

11. In an electronic image processing apparatus comprising a plurality of resources in a first configuration, an indication of the first configuration being stored in memory a method of altering the configuration of the plurality of resources comprising the steps of:

making a change to said plurality of resources providing a second configuration, comparing the second configuration to the indication of the first configuration stored in memory, displaying a difference between the first and second configurations, and confirming the difference and loading an indication of the second configuration in memory.

12. The method of claim 11 including the step of setting up the machine based upon the second configuration.

13. The method of claim 12 wherein the step of setting up the machine includes the step of automatically running selected machine set up routines.

14. The method of claim 11 including the step of initiating a service call.

15. The method of claim 11 wherein the step of displaying the difference includes the step of displaying a portion of the difference pertaining to the operator.

16. The method of claim 11 wherein the step of confirming the difference and loading an indication of the second configuration in memory includes the step of an operator providing a confirmation entry at an operator interface.

17. The method of claim 16 wherein the step of setting up the machine based upon the second configuration includes the step of automatically running through set up routines corresponding to the confirmation entry.

* * * * *